United States Patent Office 3,543,436
Patented Dec. 1, 1970

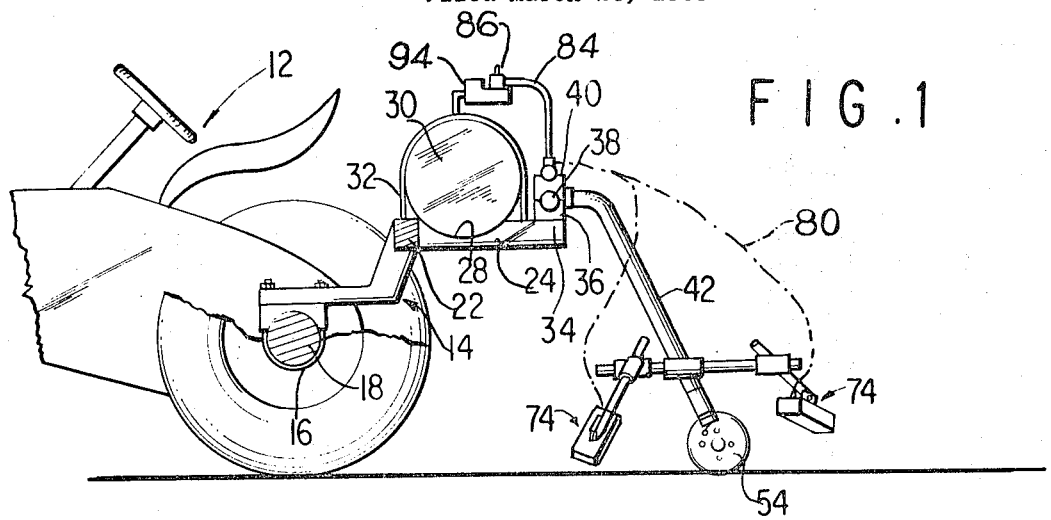
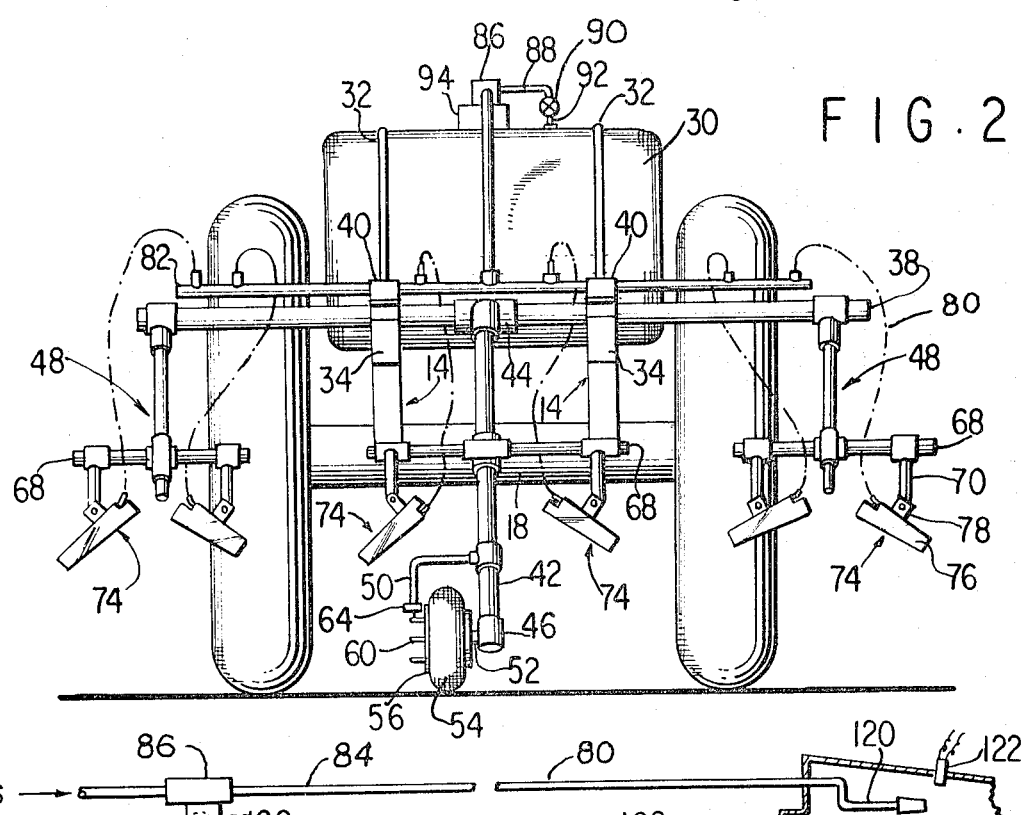
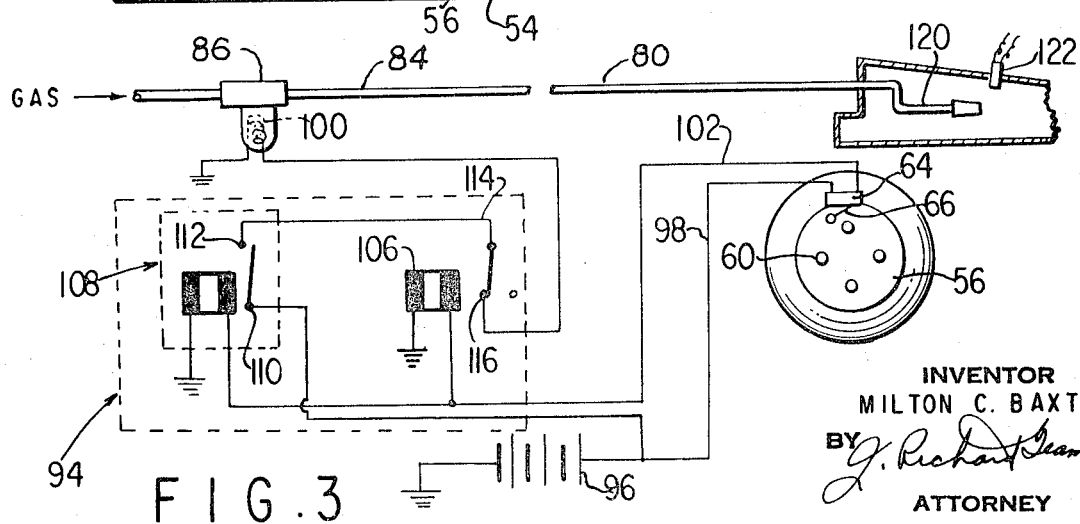

3,543,436
FLAME CULTIVATION APPARATUS
Milton C. Baxter, Cranbury, N.J., assignor to Cities Service Oil Company, Bartlesville, Okla., a corporation of Delaware
Filed Mar. 28, 1968, Ser. No. 716,845
Int. Cl. A01m *15/00*
U.S. Cl. 47—1.44   2 Claims

ABSTRACT OF THE DISCLOSURE

A tractor drawn flame cultivating apparatus for automatically controlling the application of flame to crops during cultivation is shown herein. The flame cultivating apparatus comprising a frame detachably mounted to a farm vehicle such as a farm tractor on which a plurality of gas burners are mounted. The burners are periodically supplied with combustible gas from a supply tank through an electrically controlled solenoid valve. Rotatably mounted on a leg attached to the frame is a wheel which is free rolling on the ground and has a number of equidistantly spaced camming pins extending out of the wheel hub. A microswitch mounted on the frame adjacent the wheel hub is actuated by the camming pins as the wheel turns and energizes a timed locking relay and a normally closed relay both of which are connected in series with the energizing coil of the solenoid valve. During the period of microswitch actuation the locking relay switch closes while the normally closed relay switch opens thereby not energizing the solenoid valve. Immediately after the microswitch energization is removed from the aforesaid relays the solenoid valve is opened since the locking relay switch remains closed for a preset period of time while the deenergized normally closed relay switch closes completing the series circuit to the solenoid valve and allowing gas to pass from the tank to the burners.

BACKGROUND OF THE INVENTION

Flame cultivation of row crops is now an accepted and recommended practive in farming. Briefly the object of flame cultivation in the growing of crops is to preferentially destroy weeds and other undesired growths while not damaging cultivated plants. To accomplish this, heat is applied in the form of a limited application of a flame at a desired level and direction to the rows of cultivated plants for a limited period of time. The time interval and the flame intensity are so adjusted with respect to each type of crop plant, so that the relatively brief flaming kills or materially retards the growth of the weeds and grasses but does not cause substantial damage to the crop plant.

The operation is generally performed by adjusting the combustible fluid or gas pressure to maintain a desired flame intensity and then by strictly controlling the speed of the tractor as it is driven down the row of crops. Too slow a speed might result in unacceptable damage to the crops under cultivation while too high a speed would result in not getting enough kill of the undesirable growth. Obviously it is difficult for the tractor or vehicle operator to continually maintain the speed of the vehicle constant at a predetermined level while also attending to the other requirements of operating the vehicle.

SUMMARY OF THE INVENTION

I have therefore invented a flame cultivator in which the application of the flame to the crop is automatically responsive to the speed of a farm vehicle prime mover. Briefly the invention is directed to a flame cultivation apparatus in which the periodic application of flame for an adjustable time is automatically responsive to the rate of forward travel of the cultivator, as measured by a wheel or other means for measuring rate and distance of such travel. The cultivator comprises a frame attached to the vehicle with a combustible gas supply tank mounted thereon and a plurality of burners attached to arms mounted on the frame and directed obliquely towards the ground and base of the crop. A wheel having a number of camming pins extending from its hub is rotatably mounted on the frame and rotates freely on the ground as the vehicle pulls the cultivator. Also mounted on the frame adjacent the camming pins is an actuation means, which upon being contacted by a camming pin, actuates for a preset time a solenoid valve which communicatingly connects the burners to the gas supply and thereby allows gas to pass from the supply to the burners. An ignitor in the burner ignites the gas prior to its passing out the burner nozzle.

It is therefore an object of this invention to provide an apparatus for flame cultivating crops which is responsive to variations in the speed of travel of the apparatus.

Another object of this invention is to provide a simple and efficient automatic control device for a flame cultivator.

Other objects and advantages of the apparatus of this invention will be apparent to those skilled in the art from the brief description of the drawings and preferred embodiments which follow.

BRIEF DESCRIPTION OF THE DRAWINGS

FIG. 1 is a side view of the flame cultivator mounted on the rear end of a partially shown tractor;

FIG. 2 is a rear view of the flame cultivator and rear of the tractor; and

FIG. 3 is a schematic drawing of the flame cultivator automatic control apparatus of this invention.

BRIEF DESCRIPTION OF THE PREFERRED EMBODIMENT

Referring to the drawings wherein the same reference number is used to designate similar parts of the apparatus, FIGS. 1 and 2 show the flame cultivator apparatus mounted on the rear of a farm tractor 12 by a pair of angularly shaped tractor hitching brackets 14.

The far end of the brackets 14 are fixedly attached by suitable clamps 16 to the rear axle 18 of the tractor. Each bracket 14 extends upwardly at an obtuse angle away from the tractor and is attached with suitable clamps to a transversely mounted square tool bar 22. Similarly attached to the tool bar 22 are a pair of tank supports 24 which are canti-levered away from the square tool bar 22 and parallel with the ground. The tank supports 24 each have an arcuately shaped top surface 28 on which a cylindrical liquid petroleum gas or other similarly fueled tank 30 is supported. The tanks 30 is held by two tank tie down rods 32, the ends of which are threadedly secured to each of the supports.

Each support 24 has an extension 34 at the end opposite the square tool bar mounting end, on which a conventional semi-circular clamp 36 is welded or similarly fixed. A tubular main tool bar 38 is transversely mounted on both of the semi-circular clamps 36 by two tool bar clamps 40. A leg 42 is attached at right angles to the midpoint of the main tool bar. The leg 42 is a bent tubular pipe having a mounting collar 44 at the top end and an axle mounting clamp 46 at the lower end. Similarly attached to the outer ends of the main tool bar are two burner mounting outriggers 48.

Attached to the lower portion of the leg 42 is an inverted L shaped microswitch mounting bracket 60, and a wheel axle 52 the latter being attached to the leg by the axle mounting clamp 46. Mounted on the axle 52 is a rubber tired wheel 54, preferably about 10 inches in diameter. The hub 56 of the wheels has four equidistant bolt holes circumferentially located thereon. Camming pins 60 are threadably mounted in each of the bolt holes and extend out from the hub 56 a sufficient distance to adequately clear any obstruction caused by the wheel.

The inverted L shaped switch mounting bracket 50 is secured to the leg 42 just above the top of the wheel by conventional means such as a collar, bolts, rivets, or welding and extends outwardly over the top of the wheel and down alongside the top portion of the wheel to a point above the hub. A normally open microswitch 64 with an attached lever arm 66 to actuate the microswitch is mounted on the switch mounting bracket 50 just above the wheel hub 56 with the lever arm extending downwards in a position so that it will be engaged by each one of the camming pins 60 as the wheel is rotated. Also mounted on the bottom of each outrigger 48 and on the leg 42 at a level coinciding to a point on the leg 42 above the top of the switch mounting bracket are three horizontal adjusting arms 68. The horizontal adjusting arms 68 are adjustably fixed to the leg 42 and the outriggers 48 by suitable mounting clamps in positions substantially parallel to both the ground and the axis of the wheel. On each of the ends of the horizontal adjusting arms 68 there is a burner mounting arm 70, each of which is attached at right angles at each end of adjusting arm 68 so as to be somewhat vertical to the ground. Each arm 70 has a bolt hole to which is bolted a flame cultivation burner 74 having a burner nozzle 76 obliquely pointed downwardly at the ground. The burner has an upright leg 78 also having a bolt hole and providing a means for adjustably mounting the burner 74 on the vertical adjusting arm.

Each of the gas burners 74 has a gas supply tube 80 attached thereto and extending upwardly to a gas manifold 82 axially mounted on top of the main tool bar 38. A main gas supply line 84 is communicatingly connected to the gas manifold at one end and to the outlet of a normally closed solenoid control valve 86 at the other end. A gas pipe 88 leads from the solenoid control valve into a manually controlled regulator 90 which is connected to the gas outlet 92 of the supply tank 30.

The flame cultivating apparatus is thus essentially a frame on which the various functional components such as burners, a tank, and gas distribution lines are mounted. As such, for purposes of this invention the cultivator may be either a self-supporting apparatus which is towed or it may be an integral part of the vehicle or as in the preferred embodiment it may be detachable apparatus which is mounted on the vehicle. For example, the camming pins may be attached to one of the wheels of the farm vehicle and thus eliminate the necessity of a separate wheel mounted on the cultivator.

Referring now to FIG. 3 of the drawings which shows schematically the automatic control circuit for operating the flame cultivator, an electrical control means 94 is mounted adjacent the solenoid control valve 86 and is connected by electrical conductors as described hereinafter to the solenoid valve 86, to the microswitch 64 and to an electrical power supply 96 such as a battery mounted on the tractor. The electrical control means 94 is a device which functionally controls the passage of combustible gas from the tank to the burners in response to actuation by a means for measuring cultivator travel. Thus the flame cultivator is particularly useful in crop thinning operations, where it is desired to destroy a minor proportion of the plants at spaced intervals.

In operation, the manually controlled regulator 90 is opened and set to the desired operating pressure. However no gas will be supplied to the burners until the solenoid valve 86 is opened. The solenoid valve is opened by the application of 12 volts D.C. battery supplied power, from the control means 94 which is in turn activated by the closing of the microswitch 64. The microswitch as explained above is closed by the action of one of the camming pins 60 as it contacts the microswitch lever arm 66. Thus the solenoid valve will not be activated unless the tractor is moving forward and causing the flame cultivator wheel to rotate and periodically actuate the microswitch. The control means upon being activated by the microswitch will open the valve for a preset length of time, and cause the valve to remain open for a predetermined length of time. Such an apparatus will allow the operator of the flame cultivator to determine both the length of time the flame is applied and the distance of ground over which the flame is applied irrespective of variations in speed of the tractor. Thus if it were desired to apply a burst of flame every 8 inches of forward travel, the operator would insert the four camming pins 60 into the hub of the wheel, the latter being about 10 inches in diameter, and set the control means to remain closed for about ½ second. Then if the tractor's normal flame cultivating speed were 4 miles per hour, the burst of flame would occur about every 1.4 seconds, and thus cover about one third the distance. A critical variable in flame cultivation is therefore easily controllable, namely the amount of flame applied over a specified distance of travel, regardless of the variations in tractor speed.

The control means 94 automatically controls the length of time of each burst of flame from the burners and prevents the continual application of flames should the tractor stop when the microswitch is being actuated by one of the camming pins. The power supply 96 (preferably the battery located on the tractor) supplies power for the automatic control circuitry, through conductor 98 to one side of the microswitch 64 which is of the normally open type and by mutual ground to one side of the solenoid valve actuating coil 100, and the various components of the control means 94. Conductor 102 connects the other terminal of the microswitch to one terminal each of the actuating coils of a normally closed relay 106 and a normally open timed locking relay 108. The other actuating coil terminals of the normally closed relay 106 and the locking relay 108 are connected to the negative side of the battery by suitable conductors such as mutual grounds. Connected to the positive side of the battery is a switch terminal 110 of the timed locking relay 108 while the other switch point 112 of the relay 108 is connected to a switch terminal 114 of the normally closed switch of relay 106. The other switch terminal 116 of relay 106 is connected to the actuating coil 100 of the solenoid valve 86.

In operation the closing of the microswitch 64 by one of the camming pins activates the relays 106 and 108, closing the switch of locking relay 108 for a preset period of time and opening the switch of the normally closed relay 106. The timed locking relay 108 is a specialized relay which when energized will operate to close its switch and hold or lock it closed for an adjustable present period of time. Thus no power would be applied to the solenoid valve 86 for as long as the microswitch is activated. The timed locking relay 108 will however remain closed for a preset time period e.g. ½ second, after the energization signal is removed. After the microswitch lever 66 has passed over the camming pin and the microswitch 64 is no longer closed, relay 106 will close. Relay 108 although now receiving no energization signal will continue to remain locked and closed for the preset time period thereby actuating the solenoid valve 86 for that length of time. The burner which has a conventional gas nozzle 120 and a continually applied ignitor 122 will therefore only receive a supply of gas when the cultivator is moving forward. Also the flame will be applied periodically over a predetermined portion of the ground covered irrespective of variations in the speed of the towing tractor. An obvious advantage of the present invention is the saving of fuel i.e., combustible gas, that is inherent in the automatic control of the gas flow.

Accordingly having described the apparatus of this invention and wishing to cover all changes and modifications which will be apparent to those skilled in the art without departing from the spirit and scope of the present invention,

I claim:
1. A flame cultivation apparatus comprising:
    (a) a frame;
    (b) a combustible fluid supply mounted on said frame;
    (c) a plurality of burners mounted on said frame;
    (d) valve means communicatingly connected between said combustible fluid supply and said plurality of burners;
    (e) a wheel rotatably mounted on said frame and free rolling on the ground for measuring travel of the flame cultivation apparatus;
    (f) camming means attached to said wheel;
    (g) a normally open electrical switch responsive to actuation by said camming means;
    (n) an electrical power supply connected to said electrical switch;
    (i) a normally closed relay energizable by said normally open electrical switch being closed responsive to actuation by said camming means;
    (j) a normally open timed locking relay connected in series with said electrical power supply, with said normally closed relay, and with said normally open electrical switch; and
    (k) electrical means connected to said normally open timed locking relay controlling said valve means to open when current is passed through said normally open timed lacking relay, whereby a combustible fluid is passed to the plurality of burners for a predetermined period of time.

2. The apparatus of claim 1, wherein said camming means comprises a plurality of camming pins extending out from the side of the wheel, and said switching means comprises a normally open microswitch having a lever arm responsively actuated by contacting each one of the camming pins.

References Cited
UNITED STATES PATENTS

| | | | |
|---|---|---|---|
| 439,176 | 10/1890 | Pace | 47—1.43 |
| 1,433,856 | 10/1922 | Smith. | |
| 1,961,877 | 6/1934 | Gars. | |
| 2,487,353 | 11/1949 | McLemore | 47—1.44 |
| 3,330,070 | 7/1967 | Ferm et al. | 47—1.43X |
| 3,331,340 | 7/1967 | Tschudy | 111—6 |
| 3,402,507 | 9/1968 | Tschudy | 47—1.43 |

ROBERT E. BAGWELL, Primary Examiner